No. 807,651. PATENTED DEC. 19, 1905.
C. J. ALEXANDER.
INCANDESCENT GAS BURNER.
APPLICATION FILED NOV. 10, 1904.

Witnesses:
William J. Tinkler
Winifred Grey

Inventor:
C. J. Alexander,
by Arthur J. Browne
his Attorney.

UNITED STATES PATENT OFFICE.

CHARLES JOSEPH ALEXANDER, OF FINSBURY, ENGLAND.

INCANDESCENT GAS-BURNER.

No. 807,651.     Specification of Letters Patent.     Patented Dec. 19, 1905.

Application filed November 10, 1904. Serial No. 232,120.

*To all whom it may concern:*

Be it known that I, CHARLES JOSEPH ALEXANDER, a citizen of the United Kingdom of Great Britain, residing at 60ª Wilson street, Finsbury, in the county of London, England, have invented new and useful Improvements in Incandescent Gas-Burners, of which the following is a specification.

This invention relates to incandescent gas-burners of the kind wherein the gas and air supply tube to the burner-head is provided with one or more passages within its walls for an additional supply of air; and it relates more particularly to the form of this kind of burner wherein the gas and air supply tube is formed in two parts engaging telescope-wise, the outer tube carrying the burner-head, while the inner tube is provided with one or more corrugations to form the passages for such additional supply of air.

The invention has for its object to improve the construction of such burners whereby increased lighting effect is obtained.

According to the invention the lower end of the outer telescopic gas and air supply tube carrying the burner-head is provided with a supplementary mixing-chamber preferably dome-shaped, the bottom of which chamber is provided with a central opening through which passes and fits the corrugated inner telescopic gas and air supply tube. The bottom of the chamber may also be provided with apertures for an auxiliary supply of air.

In order that the invention may be clearly understood, reference is had to the annexed drawings, in which—

Figure 1:
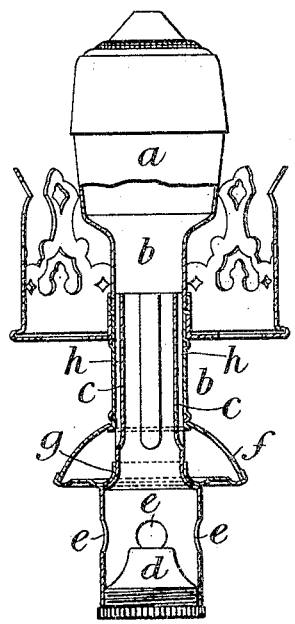
Figure 2:
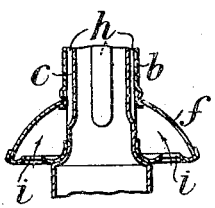

Figure 1 is a sectional elevation of a burner of the kind referred to provided with the improvements. Fig. 2 is a section of a part of the burner, showing the apertures for an auxiliary supply of air.

$a$ is the burner-head, $b$ the outer telescopic gas and air supply tube connected therewith, and $c$ the corrugated inner telescopic gas and air tube arranged within the said outer tube and through which tubes the gas and air pass from the nipple $d$ and holes $e\ e$, respectively, to the head $a$ to be mixed and burned. These parts are of known construction.

$f$ is the supplementary mixing and heating chamber provided at the lower end of the outer tube $b$, and $g$ is the central opening in the bottom of the said chamber, which fits the inner tube $c$, as shown, the said chamber being preferably dome-shaped, also as shown.

By the described construction a portion of the gas and air passing through the inner tube in addition to being mixed and heated in the head $a$ passes down through some of the passages $h\ h$, formed by the corrugations of the inner tube $c$, into the chamber $g$ and returns through some of the said passages back to the head, an additional increment of heat by the contact of the said gas and air with the heated inner and outer tubes and walls of the chamber $f$ and a further mixing of such gas and air being obtained which results in an intensely hot flame, and consequently a light of very high brilliancy.

$i\ i$, Fig. 2, are the apertures in the bottom of the chamber $f$, which can be employed to provide an auxiliary supply for the gaseous mixture.

Although the cause of the downward circulation of the gas and air, as described, being a matter of theory, is necessarily not entirely certain to me, the probable explanation is that upon the opening of the air-inlets $e$ the back pressure in the burner-head becomes so great as to establish the circulation between the two chambers by forcing the air and gas downward through certain of the channels or passages $h$. It is possible, however, that such circulation is in a degree instituted or maintained by a difference of temperature in the two chambers.

What I claim as my invention, and desire to secure by Letters Patent, is—

1. In an incandescent gas-burner, an air and gas supply tube, a primary mixing-chamber above said tube and into which said tube opens, a tubular casing surrounding said supply-tube, and enlarged near its base to form an auxiliary mixing-chamber, said tube being corrugated to provide open passages between said mixing-chambers.

2. In an incandescent gas-burner, an air and gas supply tube, a primary mixing-chamber above said tube and into which said tube opens, a tubular casing surrounding said supply-tube, and enlarged near its base to form an auxiliary mixing-chamber, said tube and casing being shaped to provide open passages between said mixing-chambers.

3. In an incandescent gas-burner, an air and gas supply tube, a primary mixing-chamber above said tube and into which said tube opens, a closed auxiliary mixing-chamber outside of said tube and below said primary mixing-chamber, and comparatively small passages opening at one end into said primary chamber and at the other end into said auxiliary chamber to establish communication between the interiors of said chambers.

4. In an incandescent gas-burner, an air and gas tube, a primary mixing-chamber above said tube and into which said tube opens, an auxiliary mixing-chamber outside of said tube and below said primary mixing-chamber, and comparatively small passages opening at one end into said primary chamber and at the other end into said auxiliary chamber to establish communication between the interiors of said chambers.

In testimony whereof I have signed my name to this specification in the presence of two subscribing witnesses.

CHARLES JOSEPH ALEXANDER.

Witnesses:
FRANCIS W. FRIGOUT,
CRANLEY L. PERRY.